United States Patent
Channing

(10) Patent No.: US 6,371,884 B1
(45) Date of Patent: Apr. 16, 2002

(54) CONSTANT POWER, PART LOAD CONTROL STRATEGY FOR ELECTRONIC ENGINE CONTROLS

(75) Inventor: Derek Albert Channing, Livonia, MI (US)

(73) Assignee: Ford Global Technologies, Inc., Dearborn, MI (US)

(*) Notice: Subject to any disclaimer, the term of this patent is extended or adjusted under 35 U.S.C. 154(b) by 0 days.

(21) Appl. No.: 09/574,481

(22) Filed: May 19, 2000

(51) Int. Cl.⁷ ............................................... B60K 41/04
(52) U.S. Cl. ...................................................... 477/107
(58) Field of Search ................................. 477/107, 108, 477/110, 111

(56) References Cited

U.S. PATENT DOCUMENTS

| | | | |
|---|---|---|---|
| 4,332,226 A | 6/1982 | Nomura et al. ............. 123/494 |
| 4,630,582 A | 12/1986 | Kuttner et al. .............. 123/339 |
| 4,646,697 A | 3/1987 | Grob et al. ................. 123/436 |
| 5,067,599 A | * 11/1991 | Roder et al. ............... 192/0.32 |
| 5,078,109 A | * 1/1992 | Yoshida et al. ............. 123/350 |
| 5,873,801 A | * 2/1999 | Taga et al. ...................... 477/5 |
| 5,879,266 A | * 3/1999 | Sawamura et al. ........... 477/62 |

* cited by examiner

*Primary Examiner*—Dirk Wright
(74) *Attorney, Agent, or Firm*—John F. Buckert

(57) ABSTRACT

A method and system for an electronic engine control includes a strategy that correlates an accelerator pedal position with a selected, constant driveshaft power level regardless of changes in the transmission ratio. The invention includes adjusting the engine speed and torque so that the driveshaft torque both before and after the transmission shift remain the same if the accelerator pedal is at the same angle. The inventive constant power, part-load control strategy improves the smoothness of transmission shifts and fuel economy by creating a direct, consistent relationship between the pedal angle and driveshaft power level.

13 Claims, 4 Drawing Sheets

CONSTANT POWER, PART LOAD CONTROL STRATEGY FOR ELECTRONIC ENGINE CONTROLS

TECHNICAL FIELD

The present invention is directed to accelerator control systems, and more particularly to an accelerator control system that controls vehicle speed and power via electronic means by creating a direct relationship between the accelerator pedal position and drivetrain power.

BACKGROUND ART

Internal combustion engines having mechanical accelerator control systems are known in the art. In these mechanically-based systems, there is a mechanical connection between the accelerator pedal and the portion of the engine that controls power and vehicle speed. In the case of throttled spark ignition engines, there is usually a mechanical connection between the accelerator pedal and the throttle, allowing the user to control power by throttling at the air intake. The throttle position and intake manifold depression in this system, in conjunction with a carburetor or electronically controlled fuel injection system, controls the power by adjusting the air/fuel ratio via mechanical means.

In the case of diesel engines, there is no air intake throttle. However, diesel engines usually have governors to control power by adjusting the amount of fuel injected into the engine. A mechanical connection between the accelerator pedal and an input to the governor allows the user to control the speed and power.

Although the mechanical controls (e.g., mechanical intake air/throttle controls, mechanical governors) allow the engine to operate adequately, the control characteristics of these structures are mechanically defined and limited. These definitions often compromise optimal engine control characteristics. Examples of part-load engine control at a constant indicated horsepower (IHP) in the prior art is shown in FIGS. 1A and 1B. FIG. 1A is a diagram showing conventional part-load control constant power in a throttled spark ignition engine, while FIG. 1B is a similar diagram for a diesel engine with a conventional max/min governor.

With respect to FIG. 1A, the roughly horizontal lines in the Figure indicate the amount of net power that is generated for a given throttle position by varying the engine speed (in rpm's). As can be seen from the curvature in the horizontal lines, the drivetrain power tends to vary for a fixed throttle position as the engine speed changes due to the mechanical limitations in the engine control system. Similarly, FIG. 1B shows lines for part-load control of a diesel engine using a different type of controls; as can be seen in the FIG., the amount of power does not remain consistent for a given load as the engine speed changes, particularly when the engine operation switches to idle. Although the characteristics are acceptable, they are not ideal because of the mechanical limitations mentioned above.

With the introduction of electronic engine controls, however, there exists greater flexibility in optimizing part-load engine control characteristics by avoiding mechanically-imposed definitions and limitations. There is a need for an accelerator control strategy that takes advantage of this flexibility.

SUMMARY OF THE INVENTION

Accordingly, the present invention relates to a method and system for generating and providing a constant power, part-load accelerator control strategy using electronic communication with the vehicle engine and powertrain. The invention takes advantage of the design freedom and lack of mechanical limitations provided by electronic engine controls and electronic communication systems by freely adjusting engine operational parameters to optimize engine control characteristics.

More particularly, the constant power, part-load engine control method of the invention optimizes the engine control characteristics by adjusting the torque and engine speed as the transmission ratio varies to keep the driveshaft power at a selected constant level for a given accelerator pedal position. A fuel table corresponding to this constant power, part-load control characteristic is generated to define the fuel quantity needed to maintain the driveshaft power at the selected level based on the engine speed and engine torque. By adjusting the engine speed and engine torque when the transmission ratio changes so that the driveshaft power for a given accelerator pedal position is constant, transmission shifts for both manual and automatic transmissions can be made more smoothly. Also, the invention allows modification of the accelerator pedal position versus power characteristics so that the relationship is not limited to a linear relationship.

DETAILED DESCRIPTION OF THE PREFERRED EMBODIMENTS

Figure 2:
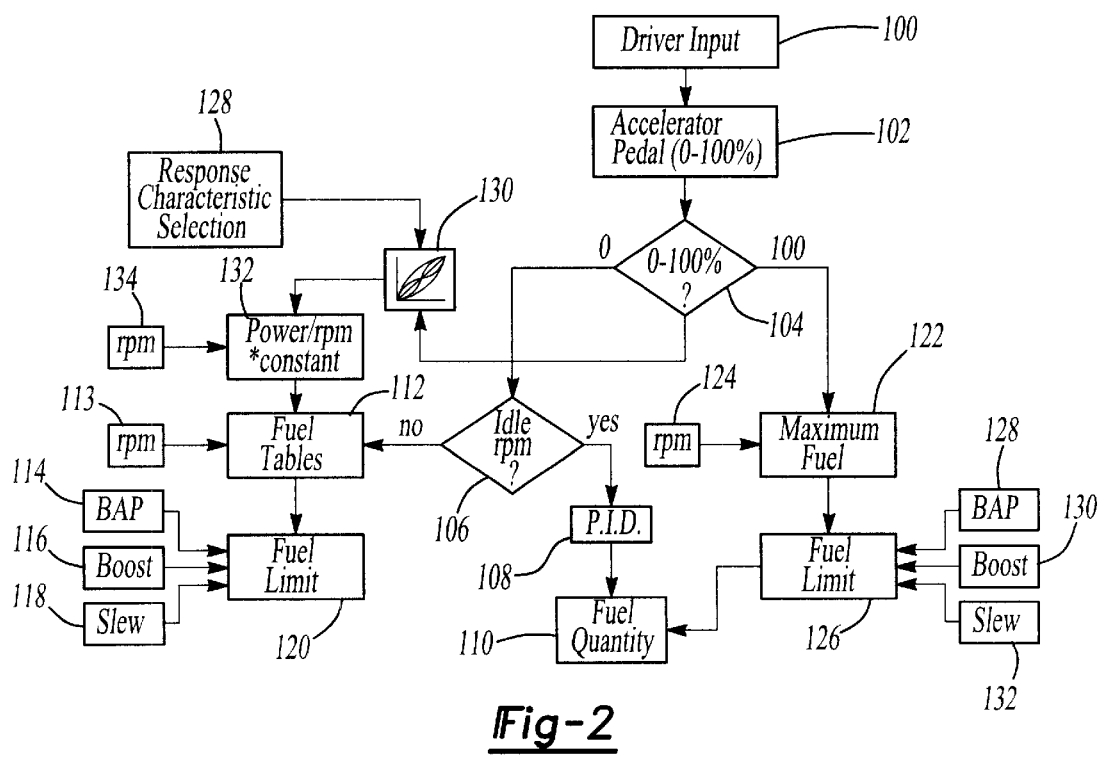
FIG. 2 is a flowchart illustrating a system incorporating the constant power, part load strategy according to the present invention.

FIG. 2 is a flowchart illustrating the process used by the inventive system for controlling driveshaft power based on a direct relationship between the pedal angle and the power due to keeping the driveshaft torque constant for a given power level, regardless of changes in engine speed and/or transmission ratio. The specific manner in which the power is kept constant will be explained in greater detail with respect to FIGS. 3A through 5F.

Figures 1A, 1B:
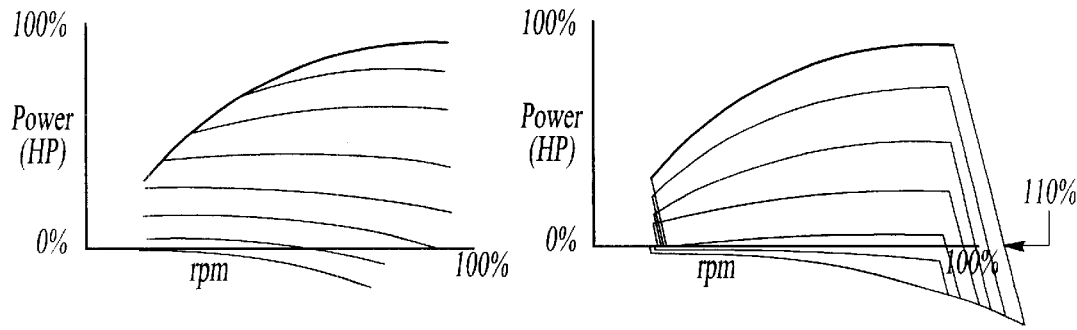
FIGS. 1A and 1B are graphs illustrating constant power, part-load characteristics for conventionally controlled engines.

Referring to the overall system shown in FIG. 1, blocks 100 and 102 indicate that the driver depresses the accelerator pedal down to a given angle, from 0–100%, to provide the system with an input as to a desired speed and acceleration. The system checks at block 104 to see whether the pedal angle is at one of the two extremes, either not depressed at all (0% angle) or depressed as far as the pedal will go (100% angle). If the pedal is at the 0% position, the system determines the amount of fuel that should be sent to the engine. Note that for spark ignition engines, the air also needs to be controlled to achieve the proper air/fuel ratio; this air adjustment, if needed, will be assumed in the examples below.

At block 106, the system determines whether the engine is at an idle rpm. If yes, the system checks the PID governor at block 108 to determine the fuel quantity needed to keep the engine idling. This fuel quantity is then sent to the engine at block 110. If the system determines that the engine is not at an idle rpm, the system references a fuel table at block 112 using the rpm of the engine (block 113) to determine an initial fuel quantity value from the fuel table 112. As explained above, the fuel table can be generated through any known means as long as it correlates engine speed with the fuel quantity needed to achieve a selected power level. In this case, at 0% pedal angle, the fuel table will generally go to zero fuel (the amount needed for friction horsepower) or a fuel quantity between the idle fuel quantity and zero.

The value from the fuel table 112 is considered in conjunction with other factors, such as barometric pressure (block 114), temperature boost pressure (block 116), and slew rate (block 118) at fuel limit block 120. Once the final, adjusted fuel quantity is determined based on the values from the fuel table 112 and the other inputs 114, 116, 118. The desired fuel quantity value from the fuel limit block 120 is then sent to the fuel quantity block 110 to provide the engine with the desired amount of fuel. As noted above, in this specific case for a 0% pedal angle, the amount of fuel may correspond to idle engine speed, friction horsepower, or a value in between, depending on the engine's specific operation.

If, on the other hand, the accelerator pedal has a pedal angle of 100% (indicating that it is depressed as far as the pedal can go) at block 100, the system checks a maximum fuel table at block 122, which provides information on fuel quantities for maximum power based on the engine speed (block 124). The maximum fuel value from the fuel table 122 is sent to the fuel limit block 126. The specific fuel quantity corresponding to the maximum power at the current engine speed is determined at block 126 in view of the barometric pressure 128, the temperature boost pressure 130, and the slew rate 132, and the adjusted fuel quantity from the fuel limit block 126 is sent to fuel quantity block 110, where the fuel is sent to the engine.

If the pedal angle is in between the two extremes mentioned above (i.e. between 1% and 99%), the process for determining the fuel quantity involves several additional steps. First, the system or the driver selects a desired response characteristic linking the accelerator pedal position with the power level. As will be explained in greater detail below, the relationship between the pedal angle and the power level does not necessarily have to be linear, but can instead emphasize different transmission states (e.g. fine control at lower power and coarse control at higher power). Once a particular power vs. pedal angle response characteristic at block 128 is selected, the accelerator pedal position information from block 104 is checked against the selected response characteristic (block 130) to determine the specific amount of power corresponding to the user-selected pedal angle.

At block 132, the power amount obtained from the response characteristic 130 is then divided by the engine speed from block 134 and multiplied by a constant to calculate the torque for the given engine speed. The fuel table 112 is then referenced based on the calculated torque to determine the fuel quantity needed to provide the desired constant driveshaft power at the given engine speed. The fuel quantity from the fuel table 112 is then sent to the fuel limit block 120 to determine whether the fuel quantity from the table 112 should be modified because of inadequate barometric pressure 114, inadequate supercharger boost 116, or control over the slew rate 118. The specific fuel quantity from the fuel limit block 120 is then sent to the final fuel quantity block 110.

Note that the values stored in the fuel tables 112, 122 are values that provide the constant net power characteristic. As explained above, because electronic control of power and vehicle speed eliminates the limitations created by known mechanical engine controls, the inventive system allows the drivetrain power to stay constant relative to the pedal angle, regardless of changes in the transmission ratio, by adjusting the engine speed and the engine torque. The fuel quantities for obtaining this constant power characteristic are generated via any known means and stored in the part-load fuel tables so that the engine receives the precise amount of fuel per stroke to maintain constant power in view of the selected response characteristic and pedal angle.

If the system is used in a vehicle having accessories that consume additional power, the fuel tables can be modified to take the additional power consumption into account. If the inventive system controls a relatively large engine, the part-load fuel tables can be based on typical net engine power. If the inventive system controls a smaller engine, where the additional power consumption from accessories would be considered significant relative to the engine power, the part-load engine tables can be based on gross engine power rather than net engine power. In this case, the fuel quantities are calculated by adding the actual accessory drive power being used to the power requested by the driver via the pedal angle. Another modification is to obtain feedback from the drive shaft to maintain the engine power at a constant value. All of these modifications to the inventive system are relatively minor and can be implemented easily by one of ordinary skill in the art.

To place the proposed system into practice, engine performance curves and fuel consumption maps, which are known in the art, are obtained for a desired engine and used to generate data for the fuel tables 112, 122 shown in FIG. 1. Generally, the data in the fuel tables are obtained by first determining the amount of engine torque needed for a given engine speed and then determining the amount of fuel, in units of mass or volume per engine cylinder cycle, needed to obtain the given engine speed and torque, assuming constant power. This fuel consumption determination can be conducted via any known means. The fuel table data is then referenced during part-load engine control via electronic control to adjust the amount of fuel, and thereby the engine speed and torque, delivered to the engine to provide constant power control during part-load operation, even if the transmission ratio changes.

Figure 3A:
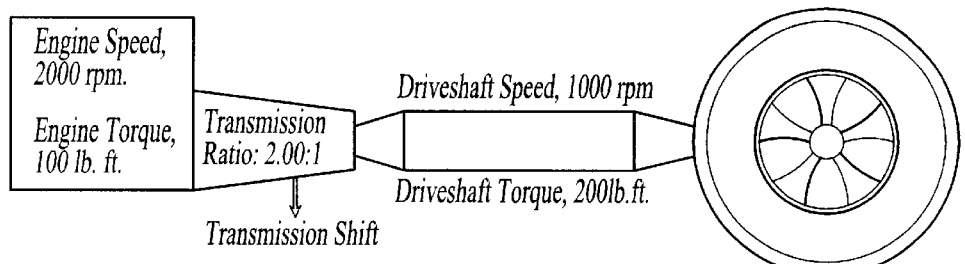
FIGS. 3A and 3B illustrates how driveshaft speed and torque are kept constant as the transmission ratio changes.
Figure 3B:
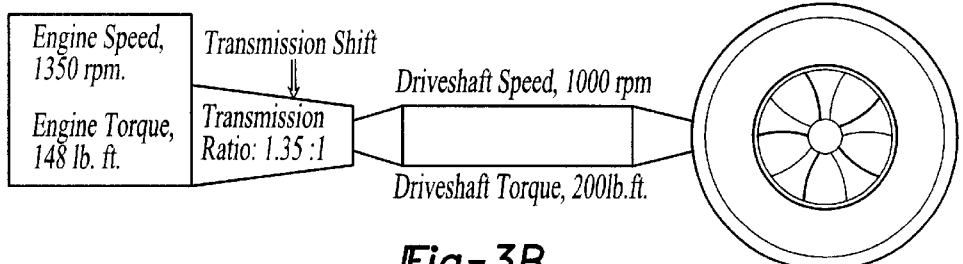

An illustration of this adjustment in engine speed and torque to obtain constant drivetrain power is shown in FIGS. 3A, 3B, 4A, 4B and 4C. Referring first to FIG. 3A, the transmission ratio is initially at 2:1, the engine speed is 2000 rpm, and the engine torque is 110 lb.ft. This generates a driveshaft speed of 1000 rpm and a driveshaft torque of 200 lb.ft. In FIG. 3B, the transmission ratio changes to 1.35:1. To keep the driveshaft torque constant after the transmission shift, the engine speed is reduced (e.g. by reducing the amount of fuel sent to the engine) to 1350 rpm and the engine torque is increased to 148 lb.ft. As illustrated in FIG. 3B, reducing the engine speed after the transmission shift allows the driveshaft speed and torque to remain the same even though the transmission ratio has changed, thereby keeping the drivetrain power constant both before and after the shift for a given load. This type of adjustment can be easily conducted with an electronic engine control, as mentioned above in the Background, and has not been possible with currently known mechanically-based engine control systems.

Figure 4A:
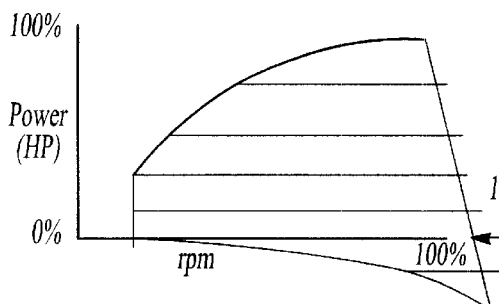
FIGS. 4A, 4B and 4C are graphs illustrating constant power, part load characteristics for engines controlled according to the present invention.
Figure 4B:
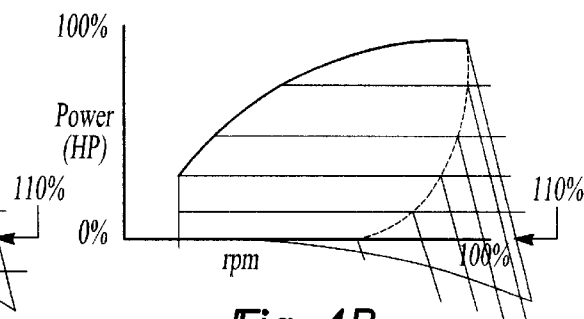
Figure 4C:
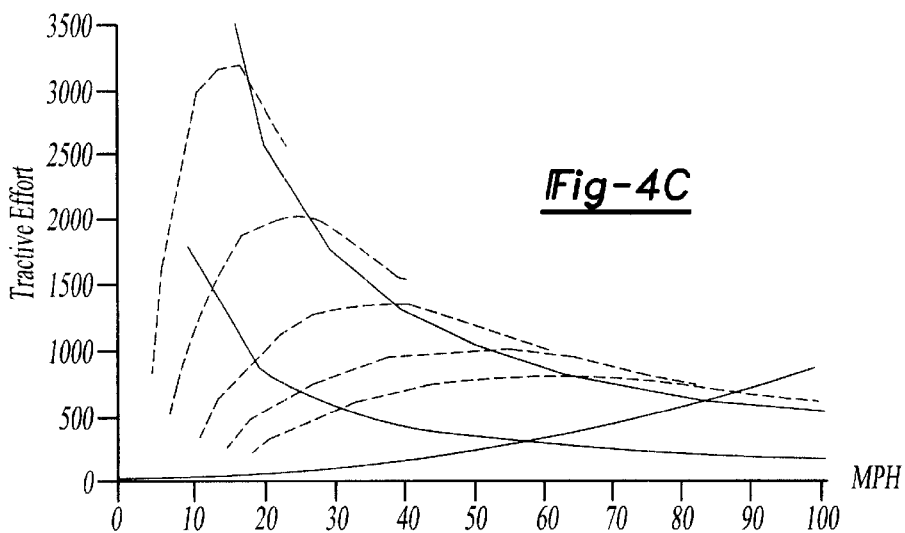

FIGS. 4A and 4B illustrates the control characteristics for an engine controlled via the constant net power, part load control strategy and system according to the present invention. Similar to FIGS. 1A and 1B explained above, FIGS. 4A and 4B show the control characteristics for a given pedal position as the power and the engine speed varies. As can be seen in FIG. 4A, the net power for a given fixed throttle position in a compression ignition engine remains constant as the engine speed varies, without experiencing any of the driveshaft power variations that occur in prior art engine control strategies and systems due to mechanical limitations. FIG. 4B illustrates a similar control characteristic for a diesel engine that is controlled according to the inventive constant power, part-load control strategy; as can be seen in the figure, the power in this case also remains constant for a given load as the engine speed changes. In this example, the negative constant power control lines are eliminated or minimized to reduce the dead pedal effect. Similarly, FIG. 4C illustrates that, for a multi-speed stepped ratio transmission, the constant net power, part load control characteristics of the present invention can provide smooth transitions in power and tractive effort when progressing through each transmission shift. In short, for a fixed accelerator pedal position, the power remains constant even if the engine speed changes, insuring that a given accelerator pedal angle will consistently correspond with a particular driveshaft power level, regardless of the transmission ratio.

Referring now to FIGS. 5A through 5E, the part-load, constant power control provided by the invention allows easy adjustment of the pedal angle with respect to the power level and ensures that the power level will be consistent for a given pedal position, regardless of how the pedal reaches that position. Information regarding typical driver acceleration methods and the responses of known engine control systems will be provided below to provide context for the engine control system of the present invention.

During vehicle operation, drivers typically accelerate in one of three ways. One way is to press the accelerator pedal down slowly until the desired vehicle speed is reached, then release the pedal slightly to maintain the desired vehicle speed. Another way is to press the accelerator pedal downward aggressively, then slowly release the pedal until the vehicle reaches the desired speed. Yet another way is to press the accelerator pedal downward to a position that approximates the position needed for the desired vehicle speed, then adjust the pedal position to maintain the speed. For any small time increment, the pedal position, and therefore the engine speed and torque (or power), will remain steady.

However, if the vehicle has an automatic transmission and a conventional mechanically-based engine control, a transmission shift may cause the torque on the driveshaft to change for the selected pedal position after the shift. The torque change after the shift would cause the vehicle acceleration rate to change, forcing the driver to readjust the pedal position to approximate the same torque as before the shift. Similarly, for a manual transmission and a conventional engine control system, the torque difference after the transmission shift forces the user to find a new pedal position that approximates the same torque on the driveshaft as before the shift.

Incorporating the inventive electronic engine control strategy according to the present invention causes the torque on the driveshaft, and therefore the vehicle speed, to stay the same for a given accelerator pedal position both before and after shifting, as explained above with respect to FIGS. 3A and 3B. The resulting consistent relationship between the accelerator pedal position and driveshaft power allows easy modification of the relationship between pedal angle and power so that the vehicle's performance can be varied in a predictable manner. Examples of possible vehicle responses are described below with respect to FIGS. 5A through 5E. In all of the examples below, it is assumed that when a driver moves the accelerator pedal downward, he is requesting an increase in power (power being the product of the powertrain component torque and rotating speed, or the vehicle drive wheel(s) tractive effort and vehicle speed). Another assumption of this invention is that when the driver is satisfied with the level of power being delivered, the driver will generally hold the accelerator control approximately in that position to maintain the power, and therefore the vehicle speed, at that level. Evaluations have shown that the constant power control characteristic that provides high vehicle wheel torque at low speed, with gradually reducing torque at higher speeds (particularly with reference to increasing vehicle torque and power required at increasing vehicle speed), is preferred by most drivers. This characteristic is shown in FIG. 5F, which illustrates the torque/speed relationship that provides a response that most drivers find preferable.

Figure 5A:
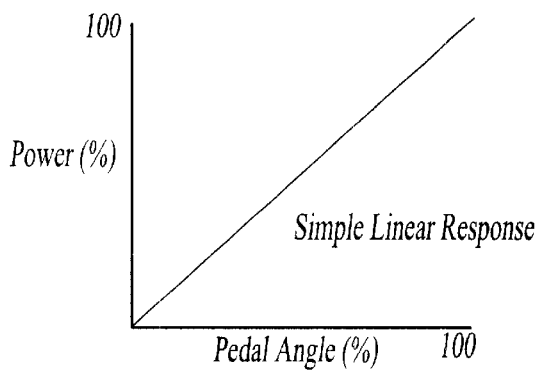
FIGS. 5A through 5F illustrate possible relationships between the accelerator pedal angle and power level in the inventive system and a preferred relationship between torque and speed.

FIG. 5A illustrates a simple linear relationship between the accelerator pedal position and the amount of power delivered to the vehicle wheels. For example, depressing the accelerator pedal to a 50% angle generates 50% of maximum power. This response characteristic provides the same amount of control at both low and high power levels, without any variances.

Figure 5B:
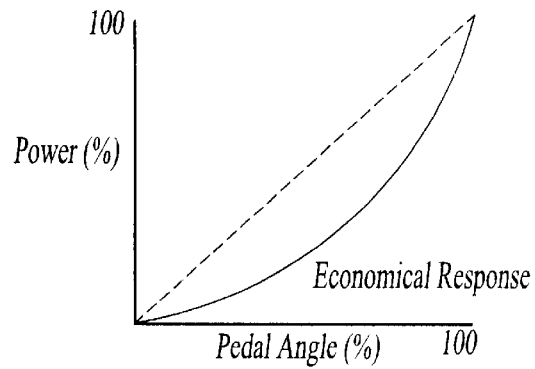

FIG. 5B shows how the response curve shape could be changed, to give finer control of power at low power levels, with coarser power control at higher power levels. As can be seen in the FIG., the power does not increase linearly as the accelerator pedal is depressed; instead, the power remains at a slightly reduced level such that larger changes in pedal angle at low power levels increases the power by smaller amounts. This example can be considered an economical response curve. For example, a pedal angle of 50% will generate only 25% of maximum power rather than the 50% power in a simple linear response. Further, in a preferred embodiment, the system allows the user to select this response curve when traction conditions are poor, such as wet or icy roads.

Figure 5C:
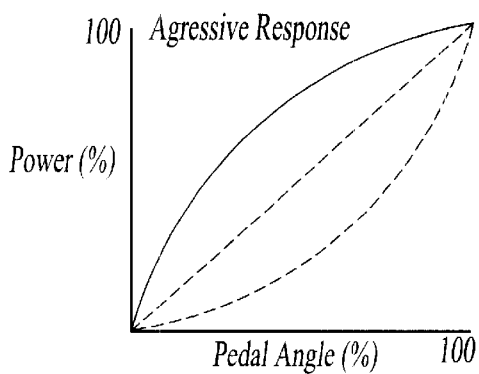

FIG. 5C shows a curve illustrating an aggressive response. In this case, smaller changes in the accelerator pedal angle causes early increases in power. For example, a 50% pedal angle provides 75% of maximum power, rather than 50% power in a simple linear response or 25% in the economical response shown in FIG. 5B. This could be called a sporty or performance response because minimal accelerator pedal movement creates large initial increases in power. This type of response may be ideal when demonstrating a vehicle for sale.

Figure 5D:
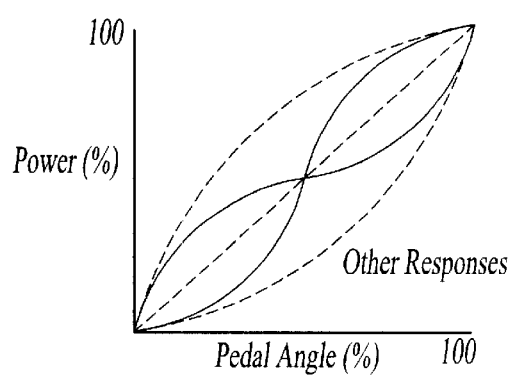
Figure 5E:
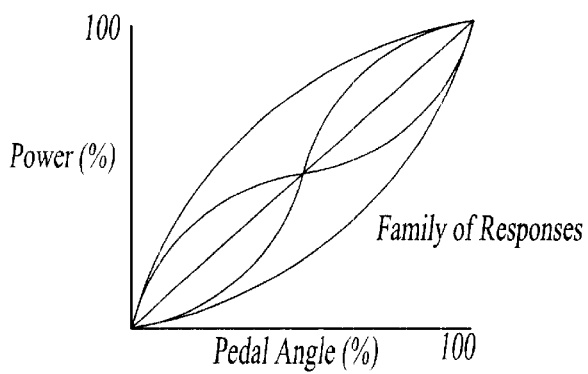
Figure 5F:
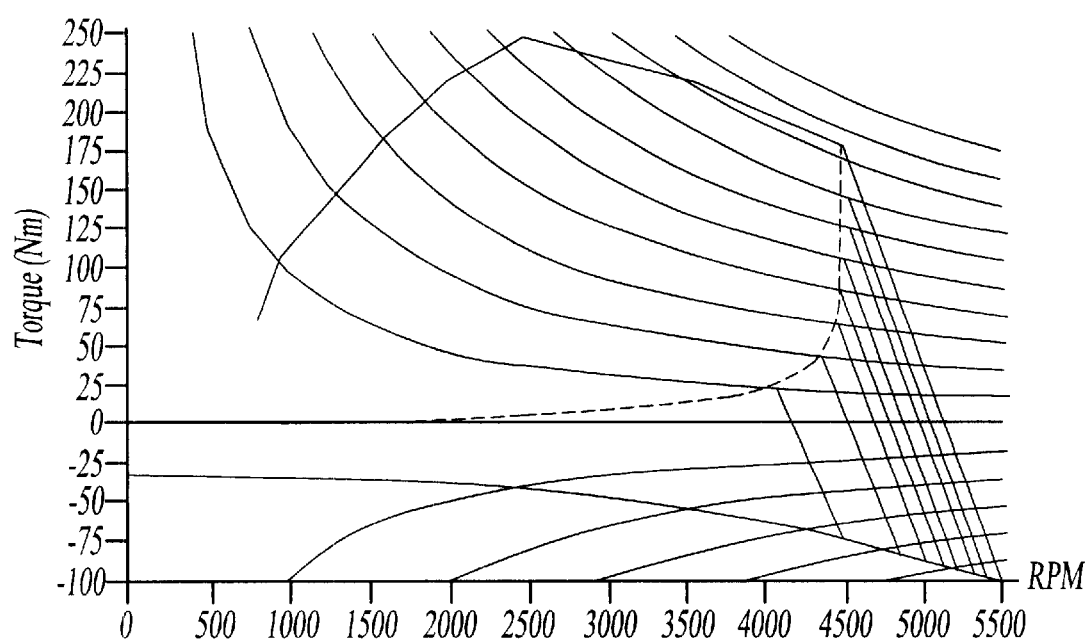

FIGS. 5D and 5E show other, more complex shapes for the response characteristic. Because the inventive system creates a direct relationship between the pedal angle and power, the response characteristic can have any shape and can be customized for specific vehicle application. For example, FIG. 5D shows a variable response characteristic that may be used in, for example, a vehicle that is fully loaded on an outbound mission but empty on the return mission. In this example, good control would be provided at approximately 0 to 25% power and 75 to 100% power. Reversing this characteristic would provide good control of a vehicle that uses the middle range of its power, providing smooth control at a 35 to 65% accelerator pedal angle. FIG. 5E shows a hybrid response characteristic that incorporates all of the response characteristics described above into a single system, providing the driver with the option of selecting a particular response characteristic based on the driver's desires or the specific driving conditions encountered by the driver. Response characteristic selection can also be conducted automatically via fuzzy logic or other methods of adapting the response characteristic to the driver's particular driving style. Of course, the possible response characteristics can be any relationship between the pedal angle and power level and are not limited to those shown in the Figures.

The inventive system is applicable to many vehicle powertrain types, in addition to those with stoichiometric spark ignition engines and compression ignition engines, with stepped automatic or manual transmissions. It is particularly applicable to vehicles with lean burn spark ignition (including direct injection, spark ignition or direct injection spark ignition (DISI)) engines, but also applicable to gas turbine engines, steam engines, electric vehicles, hybrid electric vehicles, fuel cell powered vehicles, vehicles with Continuously Variable Transmissions (CVT), etc.

The inventive constant speed, part load engine control system creates smoother shifting, improving fuel economy, smoothness of transmission shifts, driver satisfaction, and powertrain durability. Further, the inventive system allows easy calibration of operator control or automatic switching of the accelerator control characteristics to tailor the vehicle response to various driving conditions and/or to allow the driver to select a desired vehicle response (e.g. sporty, economical, etc).

The constant power, part-load characteristics provided by the inventive system allows the accelerator pedal position to control the engine power level in a consistent, predictable manner, even with changes in transmission ratios during vehicle operation. When the vehicle is equipped with an automatic transmission, for a given accelerator control part load position, the torque on the vehicle driving wheel will be the same after a transmission shift, as it was before the shift. When the vehicle is equipped with a manual transmission and clutch system, the accelerator control is usually positioned to "zero" during the shift. After the shift, moving the pedal to the same part load power position that it was in before the shift, will produce the same torque on the vehicle driving wheels. This will enable the operator to quickly learn the response characteristics of the vehicle, for smooth operation.

This invention is applicable to many vehicle powertrain types, in addition to those with electronically controlled stoichiometric spark ignition engines and compression ignition engines, with stepped automatic or manual transmissions.

Those of skill in the art will understand that the inventive system and control strategy can be used in conjunction with other types of engines and vehicles without departing from the scope of the invention.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. A method for controlling an engine comprising:
    selecting a vehicle response characteristic, said vehicle response characteristic correlating various possible accelerator pedal positions with corresponding driveshaft power levels;
    determining a desired driveshaft power level based on a given accelerator pedal position and said vehicle response characteristic;
    determining a fuel quantity needed to maintain an actual driveshaft power at said desired driveshaft power level during a transmission shift; and
    supplying said fuel quantity to cylinders of said engine during said transmission shift.

2. The method of claim 1, wherein said step of determining said fuel quantity comprises:
    determining a desired torque based on said desired driveshaft power level and an engine speed; and
    calculating said fuel quantity based on said desired torque.

3. The method of claim 1, wherein said actual driveshaft power is maintained at a constant level during said transmission shift.

4. The method of claim 1, wherein said selecting step is performed by a human vehicle user.

5. The method of claim 1, wherein said selecting step comprises the steps of:
    detecting a vehicle operating condition; and
    selecting a vehicle response characteristic corresponding to the vehicle operating condition.

6. The method of claims 5, wherein said selection of said vehicle response characteristic is performed automatically within the vehicle without specific action by the vehicle user.

7. The method of claim 1, wherein said vehicle response characteristic selection is made from a plurality of available vehicle response characteristics; and wherein at least one of said vehicle response characteristics establishes a non-linear relationship between said possible pedal positions and said corresponding driveshaft power levels.

8. The method of claim 7, wherein said plurality of available vehicle response characteristics includes: a linear vehicle response, an economical vehicle response, an aggressive vehicle response, a variable vehicle response, and a hybrid vehicle response.

9. A system for controlling an engine, comprising:
    an accelerator pedal;
    a memory containing a plurality of vehicle response characteristics, wherein each response characteristic correlates various possible accelerator pedal positions to corresponding driveshaft power levels; and
    a controller for determining a desired driveshaft power level based on a given position of said accelerator pedal and said vehicle response characteristic, said controller further determining a fuel quantity needed to maintain an actual driveshaft power at said desired driveshaft power level during a transmission shift and causing said fuel quantity to be supplied to cylinders of said engine during said transmission shift.

10. The system of claim 9, wherein said controller is adapted to determine said fuel quantity by determining a desired torque based on said desired driveshaft power level and an engine speed; and calculating said fuel quantity based on said desired torque.

11. The system of claim 9, wherein said vehicle response characteristic establishes a non-linear relationship between said possible pedal position and said corresponding driveshaft power levels.

12. The system of claim 9, wherein said memory contains the following vehicle response characteristics: a linear vehicle response, an economical vehicle response, an aggressive vehicle response, a variable vehicle response, and a hybrid vehicle response.

13. The system of claim 9, further comprising a fuel limit control that adjusts said fuel quantity based on at least one of the following: barometric pressure, boost pressure, and slew rate.

* * * * *